US007590672B2

(12) United States Patent
Slik et al.

(10) Patent No.: US 7,590,672 B2
(45) Date of Patent: Sep. 15, 2009

(54) IDENTIFICATION OF FIXED CONTENT OBJECTS IN A DISTRIBUTED FIXED CONTENT STORAGE SYSTEM

(75) Inventors: David Slik, Brackendale (CA); Tym Altman, Vancouver (CA); Markus Lampert, Burnaby (CA); Oliver Seiler, Vancouver (CA); Mike Montour, Vancouver (CA)

(73) Assignee: Bycast Inc., Vancouver, BC (CA)

( * ) Notice: Subject to any disclaimer, the term of this patent is extended or adjusted under 35 U.S.C. 154(b) by 296 days.

(21) Appl. No.: 11/609,289

(22) Filed: Dec. 11, 2006

(65) Prior Publication Data

US 2008/0140947 A1  Jun. 12, 2008

(51) Int. Cl.
*G06F 17/30* (2006.01)
(52) U.S. Cl. ...................................... 707/205
(58) Field of Classification Search .............. 707/1, 707/100, 103 R, 200, 205
See application file for complete search history.

(56) References Cited

U.S. PATENT DOCUMENTS

| | | | | |
|---|---|---|---|---|
| 5,522,077 | A * | 5/1996 | Cuthbert et al. | ........ 707/103 R |
| 5,806,075 | A | 9/1998 | Jain et al. | |
| 6,356,563 | B1 * | 3/2002 | Nicoll et al. | ............... 370/466 |
| 6,735,220 | B1 * | 5/2004 | Shirriff | ...................... 370/475 |
| 6,775,668 | B1 | 8/2004 | Goel | |
| 6,782,389 | B1 | 8/2004 | Chrin et al. | |
| 7,127,475 | B2 | 10/2006 | Gotz et al. | |
| 2003/0149709 | A1 | 8/2003 | Banks | |
| 2004/0139222 | A1 | 7/2004 | Slik et al. | |
| 2005/0021566 | A1 | 1/2005 | Mu | |
| 2005/0195660 | A1 | 9/2005 | Kavuri et al. | |
| 2006/0004820 | A1 | 1/2006 | Claudatos et al. | |
| 2006/0026219 | A1 | 2/2006 | Orenstein et al. | |
| 2006/0053262 | A1 | 3/2006 | Prahlad et al. | |

OTHER PUBLICATIONS

D. Manivannan, et al., A Decentralized token Generation Scheme for Token-Based Mutual Exclusion Algorithms, *International Journal of Computer Systems Science and Engineering* 11(1):45-54, Jan. 1996.
Daniel Herman, *Towards a Systematic Approach to Implement Distributed Control of Synchronization*, Distributed Computing Systems, 1983 pp. 50-51, 54-55.
Wesley W. Chu, et al., *The Exclusive-Writer Protocol: A Low Cost Approach For Updating Replicated Files in Distributed Real Time Systems*, Proc. 3rd Int. Conf. Distrib. Comput. Syst., Oct. 1982, pp. 219-220.

(Continued)

*Primary Examiner*—Fred I Ehichioya
(74) *Attorney, Agent, or Firm*—Knobbe, Martens, Olson & Bear, LLP (57) ABSTRACT

This disclosure describes identification of fixed content objects in a distributed fixed content storage system. Unique object identifiers are assigned in a distributed object storage system which consists of a plurality of storage media interconnected over networks subject to disruptions. The object identifier assignment prevents object identifier collisions in a distributed non-connected system regardless of the numbers of objects being stored and ensures continued operation of the object storage system in the presence of network disruptions without requiring unique identifiers for entities performing allocations. Embodiments may be used within any system where there is a need for globally unique identifiers, and the allocation of the globally unique identifiers needs to occur in the absence of network connectivity. The globally unique identifiers may be transformed for security purposes.

34 Claims, 7 Drawing Sheets

OTHER PUBLICATIONS

*Lecture Notes in Computer Science*, vol. 105—1981, pp. 194-197, 202-203, 300-301.

Milan Milenkovic, *Update synchronization in multiaccess systems*, Distributed database systems; No. 8, 1979, pp. 2-3; 8-11; 32-35.

David Slik, et al., *Scalable fault tolerant image communication and storage grid*, SPIE USE, V.2 5033-7, Jan. 17, 2003.

Keith Ma, et al., *Web-based Monitoring and Management System for Integrated Enterprise Wide Imaging Networks*, Medical Imaging 2003: PACS and Integrated Medical Information Systems: Design and Evaluation; SPIE vol. 5033 pp. 160-171.

David Slik, et al., *A Comprehensive Security Framework for the Communication and Storage of Medical Images*, Medical Imaging 2003: PACS and Integrated Medical Information Systems: Design and Evaluation, SPIE vol. 5033 pp. 212-223.

Sollins, et al., *RFC 1737 Functional Requirement's for Uniform Resource Names*l, Dec. 1994.

Sai-Lai Lo, *A Modular and Extensible Network Storage Architecture*, Cambridge University Press 1995, pp. 51, 53-54.

ISO/IEC 11578, *Information technology—Open Systems Interconnection—Remote Procedure Call (RPC)*, pp. 533-538.

Jeremy Elson, et al., *Random, Ephemeral Transaction Identifiers in Dynamic Sensor Networks*, Department of Computer Science, University of California, Los Angeles, 2001.

International Search Report and Written Opinion of related patent application No. PCT/IB2007/004580 dated Dec. 4, 2008—12 pages.

* cited by examiner

IDENTIFICATION OF FIXED CONTENT OBJECTS IN A DISTRIBUTED FIXED CONTENT STORAGE SYSTEM

BACKGROUND

A fixed-content object is a container of digital information that, once created, remains fixed. Examples of objects that could be fixed include medical images, PDF documents, photographs, document images, static documents, financial records, e-mail, audio, and video. Altering a fixed-content object results in the creation of a new fixed-content object. A fixed-content object once stored becomes immutable.

Fixed-content objects are often subject to regulatory requirements for availability, confidentiality, integrity, and retention over periods of many years. As such, fixed-content data stores grow without bounds and storage of these digital assets over long periods of time presents significant logistical and economic challenges. The long retention times result in both large data volumes and enormous numbers of objects. In many applications, access to fixed-content data occurs in a multi-facility environment linked together over limited bandwidth wide area networks. In these environments, network, hardware, or software failures should not prevent access to the fixed-content data.

To address the economic and logistical challenges associated with storing an ever growing volume of information for long periods of time, fixed-content storage systems implement a multi-tier storage hierarchy and apply Information Lifecycle Management (ILM) policies that determine the number of copies of each object, the location of each object, the retention time for each object, and the storage tier for each object. These policies will vary based on the content of each object, age of each object, and the relevance of the object to the business processes.

A multi-site, multi-tier storage system, large scale distributed fixed-content storage is needed, for example, to address the requirement for storing multiple billions of fixed-content data objects. These systems ensure the integrity, availability, and authenticity of stored objects while ensuring the enforcement of Information Lifecycle Management and regulatory policies. Examples of regulatory policies include retention times and version control.

In general, large-scale distributed systems are comprised of components (nodes) that may be inherently unreliable. Thus, as the distributed system grows in capacity and the geographic distribution of the nodes increases, the probability that all nodes are both reachable and operational decreases rapidly. The probability of all nodes being functional (e.g., reachable and operational) can be expressed by taking the probability that an individual node is functional and raising it to the power of the number of nodes. Thus, as the number of nodes increases, the probability that all nodes are functional becomes very small. When considering data integrity, it should be assumed that some nodes may be either non-operational or inaccessible.

SUMMARY

With a fixed content storage system, each stored object is given a unique identifier. This identifier is used to request the object, and to manage it throughout its lifecycle. If two distinct objects have duplicate identifiers, a request for one of the objects will result in ambiguities that can not be easily resolved. This is a fundamental violation of the integrity requirements. Furthermore, if two distinct objects have duplicate identifiers, the information lifecycle management policies may not be correctly applied to the objects and in some instances this can result in permanent loss of data.

To ensure objects have unique identifiers, the storage system must either provide an absolute guarantee that duplicate identifiers will never be associated with distinct objects, or ensure that the probability of such occurrence is minimal. However, the probabilistic approach may result in object collisions especially as the number of objects within the storage system grows because the cumulative probability of collisions increases accordingly.

A distributed fixed content storage systems is comprised of nodes where a node consists of a computing device that is connected to some non-volatile storage media. The nodes are interconnected over communication networks and together they form the distributed fixed content storage system. Both the nodes and the communication networks linking them are subject to failures. In addition, network and node failures may last for non-trivial period of time before they are repaired. To first order, the probability of all nodes being reachable and operational (functional) can be expressed by taking the probability that each node is functional and raising it to the power of the number of nodes. Thus, as the number of nodes increases, the probability that all nodes are functional becomes very small. As such, it must be assumed that in any distributed system, some nodes are either non-operational or inaccessible at any given time. It is therefore essential for the fixed content storage system to continue to operate in the presence of network and node failures.

In the event of a node failure or network disruptions, it is possible for some nodes to be disconnected from the remainder of the distributed system. This is a condition known as islanding, and it is desirable for nodes to continue to provide service even in islanded environments. Therefore, when allocating identifiers, the selected algorithm must be capable of continuing to operate while preserving the guarantees related to the avoidance of identifier collision.

In one embodiment, unique identifiers are allocated in a distributed storage system. An allocation of a range of identifiers for use in the distributed storage system is received. The range of identifiers is partitioned into subsets. A request from a first server for a first allocation of at least one subset of identifiers is received, and the first server is provided with the requested first allocation of at least one subset of identifiers. A request from a second server for a second allocation of at least one subset of identifiers is received, and the second server is provided with the requested second allocation of at least one subset of identifiers. An identifier from the first allocation of at least one subset of identifiers is transformed, and the transformed identifier is associated with a first object. An identifier from the second allocation of at least one subset of identifiers is transformed, and associated with a second object. The transformed first and second identifiers are used in a common identifier space and are assured to be unique.

In one embodiment, the transforming of an identifier uses a linear feedback shift register. In one embodiment, the transforming of an identifier is reversible. In one embodiment, the range of identifiers for use in the distributed storage system comprises a portion of the entire address space. In one embodiment, the range of identifiers for use in the distributed storage system comprises the entire address space. In one embodiment, a first distributed storage system is combined with a second distributed storage system. Prior to the combination, identifiers allocated to the first distributed storage system are unique from identifiers allocated to the second distributed storage system. In one embodiment, the first server and the second server are located at geographically separated locations. In one embodiment, the first server and the second server are located in the same geographic location. In one embodiment, an unsuccessful allocation of identifiers results in that allocation of identifiers not being used. In one embodiment, a server is provided with a requested allocation of at least one subset of identifiers by polling a plurality of servers to determine an available subset of identifiers and requiring confirmation of the allocation from a quorum of the plurality of servers. In one embodiment, the first allocation of identifiers is further partitioned into smaller subsets of identifiers. In one embodiment, the first server performs the transforming step. In one embodiment, a module that associates the transformed identifier with the first object performs the transforming step. In one embodiment, the identifiers within the range are not sequential. In one embodiment, the range of identifiers overlaps with at least a second range of identifiers.

In one embodiment, unique object identifiers are assigned to fixed content objects in a distributed fixed content storage system. A plurality of identifiers are allocated from a defined address space. The plurality of identifiers are assigned to the distributed fixed content storage system. The plurality of identifiers are partitioned into subsets. At least one subset of identifiers is assigned to a storage server. A position within the at least one subset of identifiers is maintained. An identifier based on the position within the at least one subset of identifiers is determined, transformed, and assigned to a fixed content object.

In one embodiment, at least one subset of identifiers is allocated on demand. In one embodiment, at least one subset of identifiers is allocated in advance. In one embodiment, the entire address space is allocated to the fixed content storage system. In one embodiment, at least a portion of the address space is allocated to the fixed content storage system. In one embodiment, subsets of identifiers are further sub-divided. In one embodiment, the allocating of subsets is performed across geographically separated locations. In one embodiment the steps are performed in the same geographic location. In one embodiment, an allocation of identifiers becomes unavailable when a request for the allocation of identifiers fails. In one embodiment, transforming the determined identifier is reversible. In one embodiment, transforming the determined identifier is irreversible. In one embodiement, transforming the determined identifier uses a linear feedback shift register. In one embodiment, the transformed identifier is the same as the determined identifier. In one embodiment, the transformed identifier is unique from all other transformed identifiers within the address space.

In one embodiment, unique identifiers are allocated in a distributed storage system. An allocation of a plurality of identifiers is received. Subsets partitioned from the plurality of identifiers are distributed to a plurality of computing devices that communicate over a network. An identifier selected from a partitioned subset is transformed such that the transformed identifier is unique from all other transformed identifiers, and the transformed identifier is assigned to an object.

In one embodiment, a system allocates unique identifiers in a distributed storage system. An identifier allocation management module is configured to manage allocation of subsets of identifiers from a defined address space. An identifier assignment module is configured to distribute an identifier from an allocated subset, the identifier being available for association with an object, the identifier assignment module further configured to obtain an allocation of at least one subset from the identifier allocation management module. An identifier transformation module is configured to transform the identifier to a transformed address space, such that the transformed identifier is globally unique in the transformed address space.

In one embodiment, the number of bits used to represent an identifier in the transformed address space is different from the number of bits used to represent an identifier in the defined address space. In one embodiment, the number of bits used to represent an identifier in the transformed address space is the same as the number of bits used to represent an identifier in the defined address space. In one embodiment, the identifier transformation module is located on the same server as the identifier assignment module. In one embodiment, the identifier allocation management module maintains information on a plurality of servers, and allocates subsets based on a quorum consensus of the plurality of servers. In one embodiment, the identifier transformation module comprises a linear feedback shift register.

DETAILED DESCRIPTION

Multiple heterogeneous and distributed storage and computing resources can be combined into a unified and highly reliable storage grid for the storage and transmission of fixed content data. Instead of having a central or master control system, a storage grid may use nodes that communicate with each other in a way that allows high levels of reliability and scalability.

Storage Grid Overview

Figure 1:
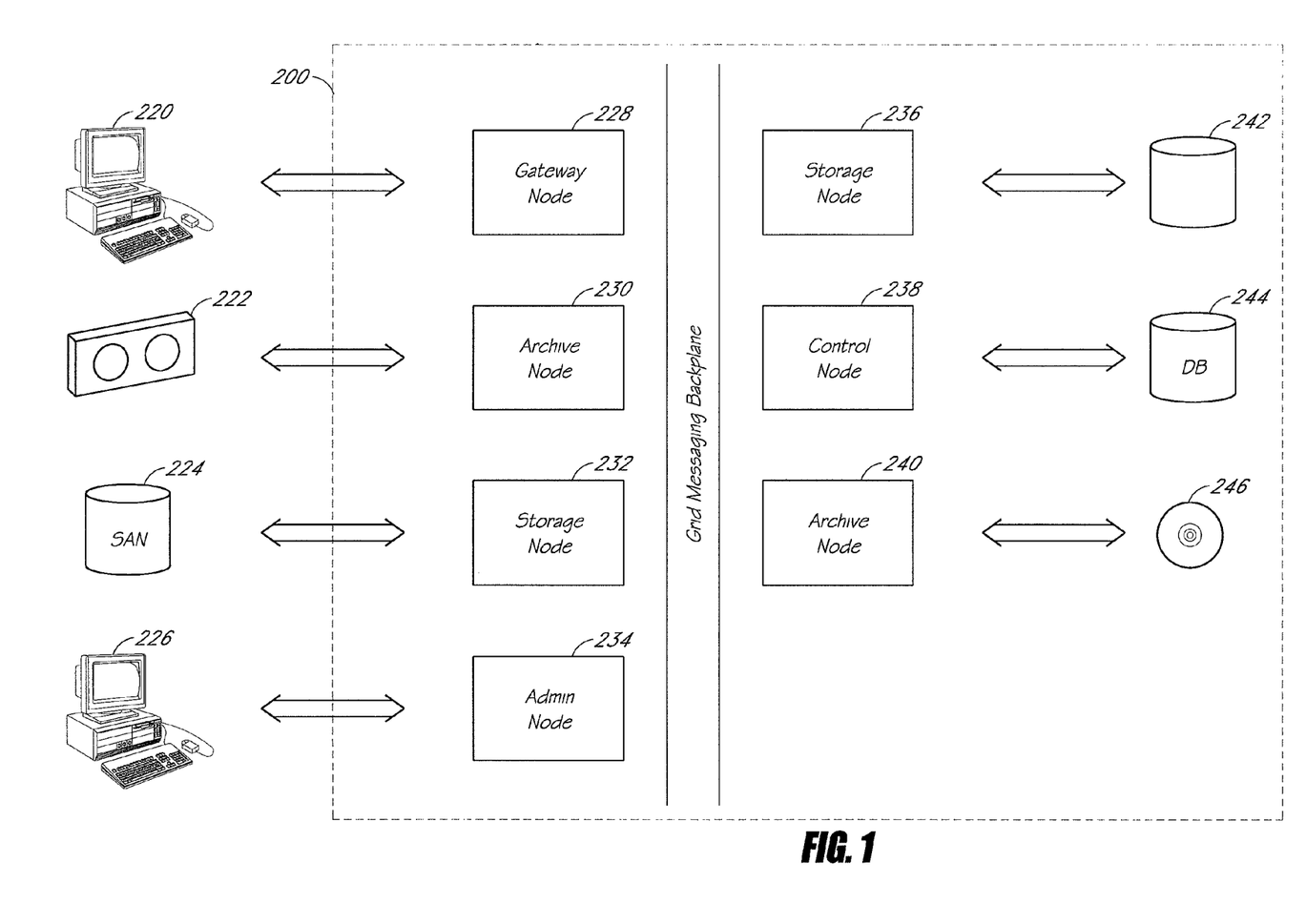
FIG. 1 illustrates various nodes in a distributed storage system.

As illustrated in FIG. 1, a typical deployment may involve multiple nodes, often spanning multiple geographically separated sites. When a request for information is made, the storage grid 200 may serve that request based on the location of the data, the location of the user, the load on the system, and the state of the network. This balances the load on the network, storage and servers in order to minimize bandwidth usage and increase performance. The storage grid 200 is a unified structure, but there may be multiple servers or repositories of content or metadata.

Nodes may be grouped based on the services they provide. For example, storage nodes 232, 236 may provide for secure data storage and transmission. A storage node may consist of a service running on a computing resource that manages storage and archival media such as a spinning media resource or tape.

The storage resource 224, 242 on a storage node can be based on any storage technology, such as RAID, NAS, SAN, or JBOD. Furthermore, this resource may be based on any grade of disk such as a high performance fiber channel or ATA disk. Storage nodes and may be linked together over, for example, LAN and WAN network links of differing bandwidth.

Storage nodes can accept data and process retrieval requests, and information input into a storage node can be retrieved from other storage nodes. Storage nodes may process client protocol requests and include support for DICOM, HTTP and RTP/RTSP. Support for NFS/CIFS may be provided, for example, through gateway nodes.

Storage nodes may replicate and cache data across multiple sites and multiple nodes. Data replication is based on a set of configurable rules that are applied to the object metadata and may take into account geographic separation of nodes as well as the bandwidth between nodes. The logic that governs replication and distribution may be enforced by control nodes.

Gateway nodes 228 provide an interface through which external applications 220 may communicate with the storage grid. Gateway nodes 228 route incoming requests to storage nodes based on, for example, the available CPU, bandwidth, storage and geographic proximately. For applications that require direct file system access, the gateway nodes 228 may provide a NFS/CIFS interface to the storage grid.

Control nodes 238 may consist of separate software services, such as the Content Metadata Service (CMS) and the Administrative Domain Controller (ADC). Although these services can run on separate computing resources, they may also share a single server. The Content Metadata Service constitutes a distributed business rules engine that provides for content metadata storage, metadata synchronization, metadata query and enforcement of replication and information lifecycle management business logic. Replication and information lifecycle management policies may be based on metadata that is associated with stored objects. This allows the creation of business rules that determine where content is stored, how many copies are stored, and on what media it is stored on throughout its lifecycle. A Content Metadata Service may interface, for example, with a local SQL database through a database abstraction layer.

The Administrative Domain Controller acts as a trusted authentication repository for node-to-node communication. It also provides knowledge of system topology and information to optimize real-time usage of bandwidth, CPU and storage resources. This allows automated management of computational resources and dynamic load balancing of requests based on the available CPU, storage and bandwidth resources.

The Administration Node 234 may consist of software components such as the Network Management Service and the Audit Service. These services may share a common computing resource, or they may be run on separate computing resources. A management interface 226 may be used to monitor and manage the operational status of the grid and associated services.

The Audit Service provides for the secure and reliable delivery and storage of audited events corresponding to content transactions across the entire storage grid. Audit events are generated, in real-time, by Storage Nodes and Control Nodes. Events are then relayed through the storage grid using a reliable transport mechanism and delivered to the Administration Nodes. Audit messages are processed by the Audit Service and may be directed to an external database or file.

The Network Management Service collects and processes real-time metrics on utilization of computing, storage and bandwidth resources. It provides real-time and historical usage reports. In addition it is responsible for fault reporting and configuration management.

The Archive Node 230, 240 may manage a locally attached tape drive or library 246 for the archiving and retrieval of grid managed objects. Archive nodes may be added to diversify archive pools and to provide archival storage at multiple sites. The storage grid 200 may also utilize external storage resources, such as a managed tape library 222 or an enterprise SAN 224.

Storage Nodes and Control Nodes in the storage grid can be upgraded, decommissioned, replaced or temporarily disconnected without any disruption. Nodes do not need to run on the same hardware or have the same storage capacity. Nodes replicate and cache data across multiple sites and multiple nodes. In addition to bandwidth savings, the intelligent distribution of information provides for real-time backup, automated disaster recovery and increased reliability.

Capacity, performance and geographic footprint of the storage grid can be increased by adding nodes as needed, when needed, without impacting end-users. This enables the storage grid to accommodate thousands of terabytes of data across hundreds of locations. The storage grid combines the power of multiple computers to achieve extremely high levels of scalability and throughput. As nodes are added to the storage grid, they contribute to the available computational and storage resources. These resources are seamlessly utilized based on bandwidth availability and geographical suitability.

In traditional archives, information is stored as files, and access to data is gained through a path pointer stored in an external database. When storage scales, old storage is replaced, or is offline, this results in broken pointers and unavailable data. In order to scale, costly and disruptive migration procedures are required. Furthermore, it is difficult to operate in heterogeneous environments and multi-site deployments. This is because the approach relies on the underlying file system and network file system protocols.

Within the storage grid, data are stored and referenced as objects. An object can be one file or a collection of files with relationships that are defined by object metadata. Object metadata constitutes application specific information that is associated with a data object. This information can be attached to or extracted from the object at the time of input into the storage grid. Object metadata can be queried and the storage grid can enforce business rules based on this information. This allows for efficient utilization of storage/bandwidth resources, and enforcement of storage management policies.

In this object oriented architecture, external applications no longer use pointers to a path, but a universal handle to an object. This enables high levels of reliability, scalability and efficient data management without the need for disruptive migration processes. Multiple object classes can be defined and for each object class, there are specific business rules that determine the storage management strategy.

In this embodiment, the storage grid is fault tolerant, resilient and self-healing. Transactions continue to be processed even after multiple hardware, storage and network failures. The design philosophy is that hardware, network, and catastrophic failures will occur, and the system should be able to deal with faults in an automated manner without impacting the stored data or end-users.

Reliability is achieved through replicas, which are identical copies of objects (both data and metadata) that are stored on multiple nodes and kept synchronized. Increasing reliability involves adding nodes to the storage grid and increasing the number of replicas for each object. The location and number of the replicas is based on a set of rules that can be configured to ensure geographical separation and the desired level of redundancy. The storage grid will automatically enforce this logic across all nodes. If a failure is detected, the system is self-healing in that additional replicas are automatically created to restore the level of resiliency.

As nodes are added, removed or replaced, the system manages the available storage. Incoming data is transparently re-directed to the take advantage of the newly added storage capacity. Within the storage grid objects are redistributed, purged, or replicated based on metadata and policies that are applied to the metadata. Objects can also migrate from one storage grade (e.g., disk) to another (e.g., tape) not simply based on time and date stamps, but external metadata that indicates the importance of the object to the specific business application. For example in medical applications, certain imaging exams may be immediately committed to deep storage. In applications for the financial sector, retention policies may be set up to facilitate compliance with regulatory requirements for data retention.

Users may input and retrieve data from the location within the storage grid that is closest to them, thereby efficiently utilizing bandwidth and reducing latency. In addition, as information is requested, it may be cached at the requesting Storage Node to enable improved bandwidth efficiency.

Obsolete components can be removed without impacting services or endangering stability and reliability. A Storage Node may be decommissioned through the administrative console. When this takes place, the storage grid may automatically redirect requests to alternate nodes. Furthermore, the storage grid may transparently re-distribute the stored data on other suitable Storage Nodes. This allows for seamless removal of obsolete hardware without any disruptions to storage grid operations. This is in contrast to disruptive data migration procedures that are common in many fixed content applications. Operators can eliminate support for obsolete hardware while taking advantage of the economic benefits of decreasing costs of storage and increases in processing power. Each newly added node costs less and provides more processing power and storage capacity.

When data and metadata are stored into the storage grid, the data and metadata is packaged into an object. Objects consist of data and associated metadata that are managed as an unalterable and atomic entity. Once stored, these objects are actively managed throughout their information lifecycle. When an object is retrieved, the original data and associated metadata is presented for use. This provides a transparent storage service to external entities.

Each object stored may have a unique identifier that acts as the primary identifier for the object. This identifier may be assigned at the time the object is created. Objects can be moved from one object store to another.

Objects stored within the grid may contain metadata, which is used to manage the objects over their lifecycle and facilitate access to the objects. Object metadata may include, for example, Content Block metadata, Protocol metadata, Content metadata, User metadata, or Management metadata.

Content Block metadata may be metadata associated with the object creation process itself, and provides information about the packaging and protection of the user provided data and metadata. An example of this type of metadata is the size of the data stored in a given object.

Protocol metadata may be metadata associated with the protocol used to store the object, but not intrinsic to the data within the object. This includes metadata required to perform protocol specific transactions. For data stored through the DICOM protocol, an example of this type of metadata is the DICOM AE title of the entity that stored the data.

Content metadata may include metadata contained within recognized types of content. If so processed, metadata specific to each recognized type of content is extracted from the content. For content of type PDF, an example of this type of metadata is the number of pages in a document.

User metadata may include arbitrary metadata specified by the entity storing content into the grid. This ability to attach user metadata is limited by the protocol used to store the objects. An example of this type of metadata is a private identifier assigned by the user.

Management metadata consists of metadata generated and modified over time as objects are managed within the grid. Unlike the previous four classes of metadata, this metadata is not immutable, and is not present as part of the object itself. An example of this type of metadata is the time when an object was last accessed.

Each time a new object is stored, the metadata associated with the object is also stored in a separate subsystem that maintains a repository of metadata. The metadata store can be queried to return the metadata associated with a given object. Queries can also be performed to return a list of objects and requested metadata for all objects that have metadata that matches a specific query.

By mapping relationships between metadata, composite objects can be created. Metadata queries can be constructed to return multiple objects that share a given a value for one or more pieces of metadata.

For example, with the DICOM protocol, the study ID associated with each instance is part of the content metadata. All instances with a given study identifier are considered to belong to the same study, and by considering objects with a given study identifier as belonging to a larger, composite "Study" object, all of the objects comprising a study can be managed and accessed as a group.

Because composite objects are defined as relationships between object metadata according to a defined schema, they are virtual and do not exist as actual stored objects. When a schema for a composite object has been defined, queries and rules can then refer to these objects directly for management and query purposes.

Placement of objects may be based on the capabilities of the storage grid computing resources. Different computing resources have different capacity to perform work. While this is primarily measured based on the clock frequency of the processor, the number of processors and relative efficiencies of different processor families may also be taken into account. In addition, the amount of CPU resources that are currently in use provides a mechanism to determine how "busy" a given resource is. These characteristics are monitored and measured to allow decisions to be made within the grid about which computing resource is best suited to use to perform a given task.

Placement of objects may also be based on the characteristics of the storage resources, such as storage latency, reliability, and cost. Storage capacity provides information for calculating risk in the event of rebuild. A measurement of the amount of storage capacity that is currently in use provides a mechanism to determine how fall a given storage resource is, and determine which locations are more able to handle the storage or migration of new content. Different storage resources have different throughput. For example, high performance Fiber-Channel RAID systems will deliver better performance then a lower performance software RAID on IDE drives. A measurement of the amount of I/O bandwidth that is currently in use provides a mechanism to determine the extent to which a given storage resource is able to handle additional transactions, and how much it will slow down current transactions. Storage resources can be read-only, and thus not a candidate for the storage of new objects. These characteristics may be monitored and measured to allow decisions to be made within the grid about which storage resource is best suited to use to retain objects over time, and influence the rules that determine where objects should be stored.

Placement of objects may also consider the characteristics of network paths, such as latency, reliability and cost. Different network paths have different amounts of bandwidth available. This directly maps into the time required to transfer objects from one storage repository to another. The amount of the network bandwidth that is currently in use may also be considered. This provides a mechanism to determine how "busy" a given network link is, and to compare the expected performance as compared to the theoretical performance. These characteristics may be monitored and measured to allow decisions to be made within the grid about which network path is best suited to use to transfer objects through the grid.

When objects are stored in multiple different locations, the probability of data loss is reduced. By taking common-mode failure relationships and fault probability information into account, the probability of data loss and data inaccessibility for a given placement of objects can be quantified and reduced to manageable levels based on the value of the data in question.

To avoid common mode failures, replicas of objects can be placed in separate failure zones. For example, two replicas created within a single server room can take into account that storage on nodes that do not share a single UPS has a higher probability of accessibility then two replicas stored on two nodes that share the same UPS. On a larger scale, two replicas created in geographically distant locations have a lower probability of loss then two nodes within the same facility.

As replica placement rules are metadata driven, they can be influenced by external systems and can change over time. Changes to existing replicas and changes to the topology of the grid can also influence replica placement rules.

Replica placement can reflect the instantaneous, historical and predictive information associated with a given resource. For example, monitoring of server and storage health can dynamically influence the degree of reliability attributed to a given resource. Different types of storage resources, such as IDE vs. SCSI, have different reliability characteristics. In addition, archival and offline storage often have a distinct media lifetime, which need to be managed to preserve archive integrity. These are both examples of the use of information about available resources is used to determine the best solution for a given set of constraints.

Implementation of configuration information based on formal risk analysis can further optimize the resource tradeoff by providing information about common mode failures that cannot be automatically discovered by the grid. For example, the placement of two replicas on nodes situated along the same fault line may be considered to be within a common failure mode, and thus suboptimal when compared to the placement of one of the replica in a facility not located on the fault.

The use of external data feeds can provide valuable information about changes in the reliability of a given failure zone. In one scenario, a live feed from the weather monitoring system can provide advance notice of extreme weather events, which could allow the grid to dynamically rebalance content to reduce the risks associated with the loss of connectivity to a given facility.

Unique Object Identifiers

The management of fixed-content information requires each unique object to be assigned a globally unique identifier. This unique identifier has a one-to-one correspondence to the object, and is used to reference the object.

Object identifiers may be assigned based on a mathematical operation on all or part of the content on an object. For example, when an object is stored into the fixed-content storage system, the contents of the object (and some or all associated metadata) may be run through a hashing algorithm to generate a unique identifier associated with the object.

This approach allows independent and disconnected entities to simultaneously generate object identifiers, where the probability of a collision is based on the mathematical properties of the hashing algorithm and the size of the hash used. As the number of object grows, there is a non-zero probability that two different objects will result in the same hash, especially given that the data which is used to generate the hash can be specified by external users.

Alternatively, object identifiers may be assigned using a random number generation mechanism. When an object is stored into the fixed-content storage system, a random identifier is generated and associated with the object. This approach allows independent and disconnected entities to simultaneously generate object identifiers, where the probability of a collision is based on the randomness of the random number generation algorithm and the size (number of bits) of the identifier. Detection of collisions requires global synchronization of knowledge of object identifiers and in the event that parts of the storage system may be islanded, synchronization can not be guaranteed.

Object identifiers may also be assigned based on time. When an object is stored into the fixed-content storage system, the current time of the system is taken and used to generate an identifier that is associated with the object. Some additional system-unique information may be added to prevent collisions.

This approach allows independent and disconnected entities to simultaneously generate object identifiers, where the probability of a collision is based on the rate at which identifiers are being generated. If a sufficiently high resolution of time can be captured, accurate time synchronization is achieved system wide, and the system-unique information is indeed unique, this approach guarantees that collisions will never occur.

Object identifiers may also be assigned a value by one or more central authorities. When an object is stored into the fixed-content storage system, a network transaction is performed to an allocation entity, which hands out an identifier which is associated with the object. This approach requires connectivity between the entities requiring object identifiers and the allocation entity. In disconnected operation, this connectivity is not available.

Consider a distributed system comprised of multiple discrete nodes (N) where a node is a compute resource that is connected to a limited volume of non-volatile storage. Nodes are connected by unreliable networks which are subject to disruptions. Assume that a subset of jobs performed on N will require the allocation of a globally unique identifier. Thus, given the existence of such jobs and lack of guaranteed network connectivity, globally unique identifiers will need to be generated while network connectivity is both available and not available. Furthermore, assignment of duplicate identifiers will result in an inconsistent system state. This state is extremely computationally expensive to detect, and will result in incorrect system behavior. Thus, duplicate identifier assignment must be avoided.

Two approaches are possible: allocation schemes where it is provable that collisions will not occur and allocation schemes where it is extremely improbable for collisions to occur. Probabilistic allocation schemes provide less viable solutions for the following reasons:

Smaller identifiers are advantageous from a client and system standpoint. Given identifiers for M objects, if twice the number of bits is used for each randomly generated identifier, there is still a 50% chance of a collision. To reduce the probability of collisions to the point where it is statistically improbable, four to eight times the number of bits is required.

Probabilistic methods do not eliminate the potential for collisions. It is perceived by some customers and evaluating groups that the risk of a collision is too high when a probabilistic approach is used. This remains the case even if the probability of a collision is lower than the probability of other system failure scenarios, such as software defects and asteroid strikes.

Algorithms that rely on user-provided information to generate identifiers may have flaws that can be manipulated to generate duplicate identifiers. This represents a security risk if collisions can be deliberately generated as an attack against the storage system.

Thus, the algorithm used to generate globally unique identifiers should ensure that identifiers are not re-used. The life of the data in fixed content storage system can easily exceed the lifetime of the underlying computing hardware and identifier generation schemes must maintain uniqueness over long periods of time even when older hardware resources are replaced with newer technologies. Accordingly, the allocation scheme should not depend on unique information intrinsic to the compute resource. The allocation scheme should be able to start up without state, maintain state information it has generated itself, and be capable of continuing to operate correctly even if the stored state has been lost.

Within a fixed-content storage system, globally unique identifiers are assigned for each stored object. In the event that additional identifiers cannot be generated, no further data can be stored. If two distinct objects have duplicate identifiers, content integrity requirements are violated and data loss can result. In a distributed fixed content storage system which is expected to be islanded for non-trivial periods of time, identifiers uniqueness should be maintained. Accordingly, it is desirable to assign unique object identifiers that avoid collisions and can operate in an islanded distributed fixed content storage system.

Allocating blocks of identifiers to storage resources is one way to avoid assigning duplicate identifiers, even if the storage resource is disconnected from the rest of the network for a non-trivial period of time.

Figure 2:
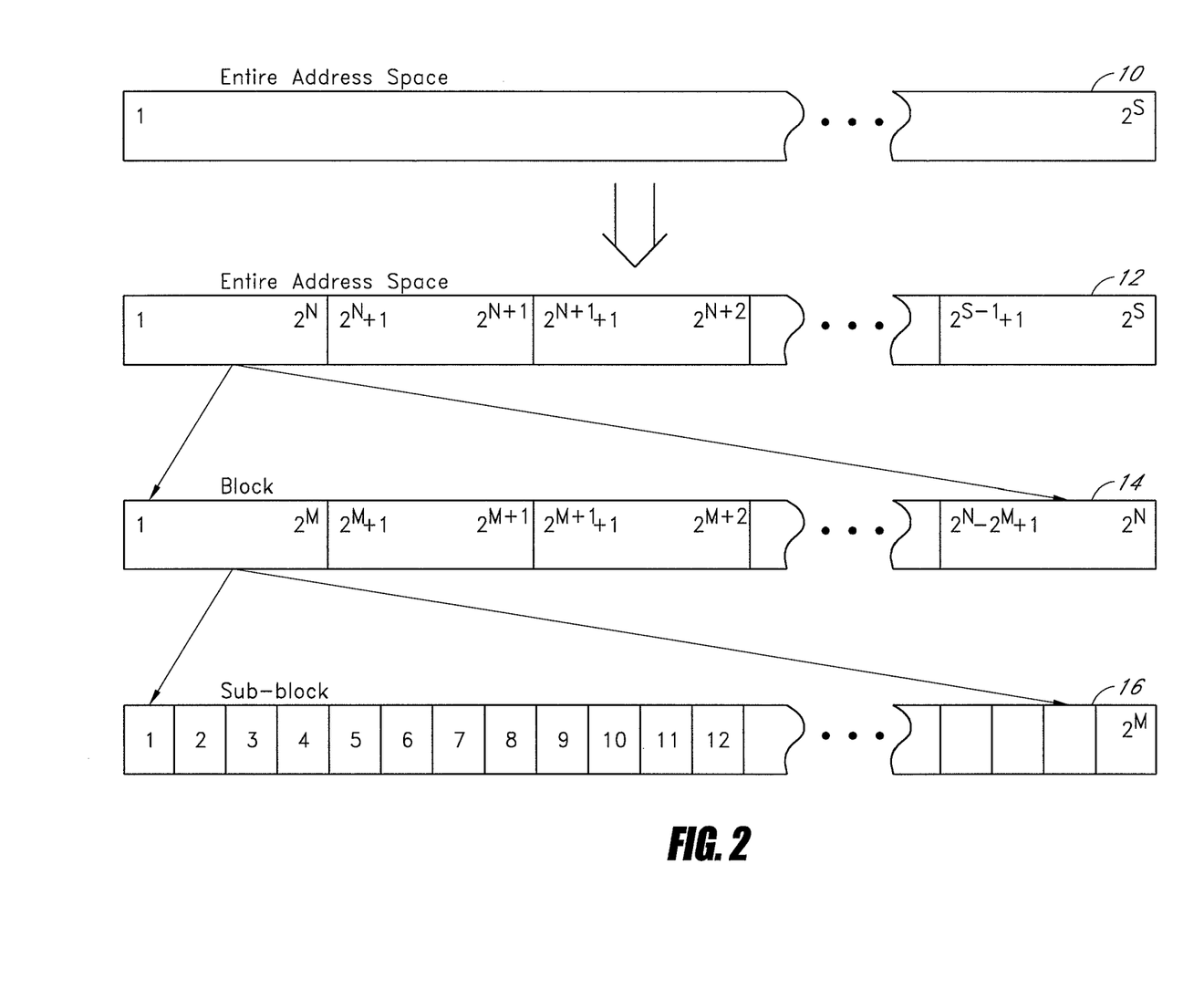
FIG. 2 illustrates allocation of identifiers in an identifier address space.

FIG. 2 illustrates the basic concepts of block allocation in a multi-tier embodiment. As shown at 10, each identifier in the Address Space is represented with S number of bits, meaning that $2^S$ unique identifiers are available. As shown at 12, the Address Space is divided into a series of blocks. In this example, the blocks are evenly divided into blocks of size $2^N$ for convenience. In other embodiments the blocks may have differing sizes. At 14, the first block having a range from 1 to $2^N$ is divided into sub-blocks. Again, the blocks in this example are evenly divided into blocks of size $2^M$ for convenience, but other embodiments may use sub-blocks of varying size. The first sub-block is shown at 16 as having $2^M$ unique identifiers. The example illustrated in FIG. 2 shows a two-tier implementation for the distribution of identifiers. A single-tier or multi-tier implementation for distributing blocks, sub-blocks or identifiers could also be used. In a multi-tiered system, a first tier distributes blocks to a second tier, and the second tier distributes blocks to the storage nodes or lower tiers. An upper tier may request multiple blocks for distribution to lower tiers, or the upper tier may divide a block into sub-blocks for distribution.

A two-tier configuration may be used, for example, where a cluster of storage nodes are located in the same geographic proximity in a storage system that has components located over a diverse geographic distribution. For example, one or more blocks of object identifiers could be assigned to storage entities residing on the same local network. Sub-blocks or individual identifiers could be allocated to the storage nodes as needed.

When an entity needs additional blocks or sub-blocks, an unallocated block or sub-block is marked as used, then given to that entity. The ordering of this marking ensures that blocks or sub-blocks are not given out twice. Thus, failures will only result in the leakage of blocks or sub-blocks. Once a block or sub-block is marked as used, it cannot be reused.

When an entity has a block, it keeps track of which identifiers within that block have been used. This is typically performed using a current position. The current position acts as a pointer to a specific location within the entire address space, and has a value that has the same number of bits as the size of the address space.

A storage entity does not necessarily need to deplete the allocated object identifiers before requesting allocation of one or more additional blocks. A storage entity could, for example, keep one or more blocks in reserve to allow the storage entity to continue to assign object identifiers during periods when the storage entity is isolated or unable to obtain additional block allocations.

Some storage entities may need allocation of more object identifiers than other storage entities. To meet this additional demand, a storage entity may request allocation of multiple blocks and/or keep multiple blocks in reserve.

The distributed fixed-content storage system may consist of multiple independent computing and storage resources connected together over wide area networks of varying bandwidth. Each computing resource within this distributed system hosts an operating system along with specific application services and is connected to one or more storage resources. Each computing resource within the distributed fixed-content storage system constitutes a node of a distributed computing network and the types of services that run on each node determine the functions performed by that node. The entire distributed fixed-content storage system is termed a "grid".

Figure 3:
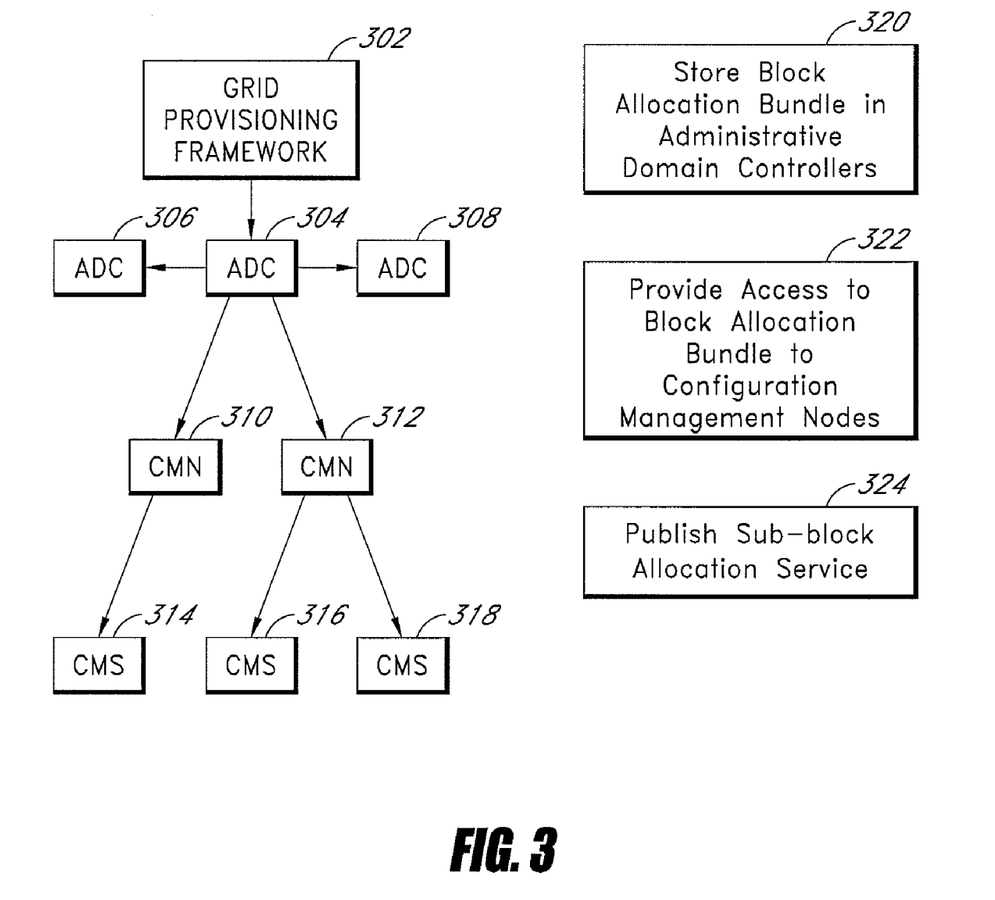
FIG. 3 illustrates communication between nodes in a distributed storage system to establish a sub-block allocation service.

FIG. 3 illustrates an example of an identifier allocation system operating within a grid. The Grid Provisioning Framework 302 for each grid allocates blocks for the grid infrastructure. The blocks allocated by the Grid Provisioning System 302 are passed to the grid in the form of a secure digital package of data called the "Block Allocation Bundle", which is loaded into the Administrative Domain Controller (ADC) as part of the deployment process.

The distributed fixed-content storage system may coordinate computing and storage resources without a central point of control. It may also be redundant in that failure of any individual component does not impact the operation of the system. The system may further provide external applications with a series of standardized protocols to store and retrieve fixed-content objects.

In one embodiment, a subset of nodes in the distributed fixed content storage system run a service called the Storage Node Service which provides for the storage, protection, lossless compression, encryption, verification, caching, and transmission of fixed-content objects between nodes and to client applications. Each storage node utilizes a computing resource and a finite amount of a non volatile storage that is assigned to the said computing resource. The non volatile storage resource may spinning or removable media and may be attached to the computing resource either directly or via the network.

A subset of nodes 314, 316, 318 in the distributed fixed content storage system run a service called the Content Metadata Service (CMS) that provides for object metadata storage, object metadata replication, object metadata synchronization, object metadata query, object location lookup, and object location query. These nodes are designated as control nodes. In addition to metadata management, the control nodes embody and enforce the Information Lifecycle Management business rules that govern the lifecycle of a fixed-content object within the storage system. Each control node utilizes a computing resource with a finite amount of non-volatile storage media. The storage media may be internal to the computing resource or externally attached either directly or via the network. To store and perform queries on object metadata, the Content Metadata Service may utilize a relational database which may be hosted on the same computing resource.

A subset of the nodes 304, 306, 308 in the distributed fixed content storage system run a service called the Administrative Domain Controller (ADC) that provides automated resource management, topology management and node authentication.

A subset of the nodes (not illustrated) within the distributed fixed content storage system run a service called the Gateway Node Service. This service provides for protocol processing. These services enable external applications to store and retrieve fixed-content objects from the storage system.

One or more of the nodes 310, 312 in the distributed fixed content storage system run a service called the Configuration Management Node (CMN) which is a repository of configuration information for the distributed fixed content storage system. The Configuration Management Node enables simple management and configuration of a distributed system spanning multiple sites and elements from a single entity.

Prior to the installation of a distributed fixed content storage system, the deployment topology including the number of sites and their geographic location, the network link speeds, the number of nodes, the services running on each node and other system parameters are specified and configured using a provisioning framework 302. The grid provisioning framework 302 allocates blocks of object identifiers for use in the grid. The blocks of object identifiers are unique from object identifiers that may have been assigned to other grids.

At some point it may be necessary to merge two storage grids. For example, a first hospital system may merge with a second hospital system, and the records from the two hospital systems need to be combined. Because each of the storage grids used unique blocks of object identifiers, the individual object identifiers will not conflict.

The blocks of object identifiers assigned by the grid provisioning framework 302 may be sufficiently large to provide unique identifiers for all conceivable objects to be stored in the storage grid. A storage grid may also request additional blocks of object identifiers from the grid provisioning framework 302 as needed.

In one embodiment, the provisioning framework 302 for the fixed-content storage system uses a block-allocation technique to generate 40 bit blocks. Each provisioned grid is allocated one or more blocks. A single 40 bit block provides sufficient unique identifiers to allow the provisioned grid to allocate one trillion identifiers, assuming no failures occur during the allocation process. If more unique identifiers are needed for a specific grid, additional blocks can be added as needed.

Entities within the grid that require globally unique identifiers request one or more 24 bit sub-blocks as part of the process of joining the grid. Once the sub-blocks have been allocated, these entities are capable of generating globally unique identifiers until the allocated sub-blocks have been consumed. During periods of connectivity, additional sub-blocks can be requested, preventing exhaustion except in the case of extremely long periods of disconnection As illustrated in FIG. 3, a control node running an Administrative Domain Controller maintains information about the block of object identifiers. This information is referred to as a block allocation bundle. In the illustrated example, the grid provisioning framework 302 provides Administrative Domain Controller 304 with a block allocation bundle at step 320. The Administrative Domain Controller 304 propagates the block allocation bundle to other administrative domain controllers 306, 308 in the storage grid. Replication of the block allocation bundle to multiple Administrative Domain Controllers allows the storage grid to continue assigning sub-blocks of object identifiers even if one of the Administrative Domain Controllers is not accessible.

The block allocation bundle can be accessed by additional control nodes, such as Configuration Management Nodes. At step 322, the administrative domain controller 304 communicates information about the block allocation bundle to Configuration Management Nodes 310, 312.

The Configuration Management Nodes 310, 312 publish a sub-block allocation service to the storage grid at step 324. The Content Metadata Service 314, 316, 318 discovers the published service and requests a sub-block to be allocated when it requires sub-blocks (such as when it first joins the grid).

Figure 4A:
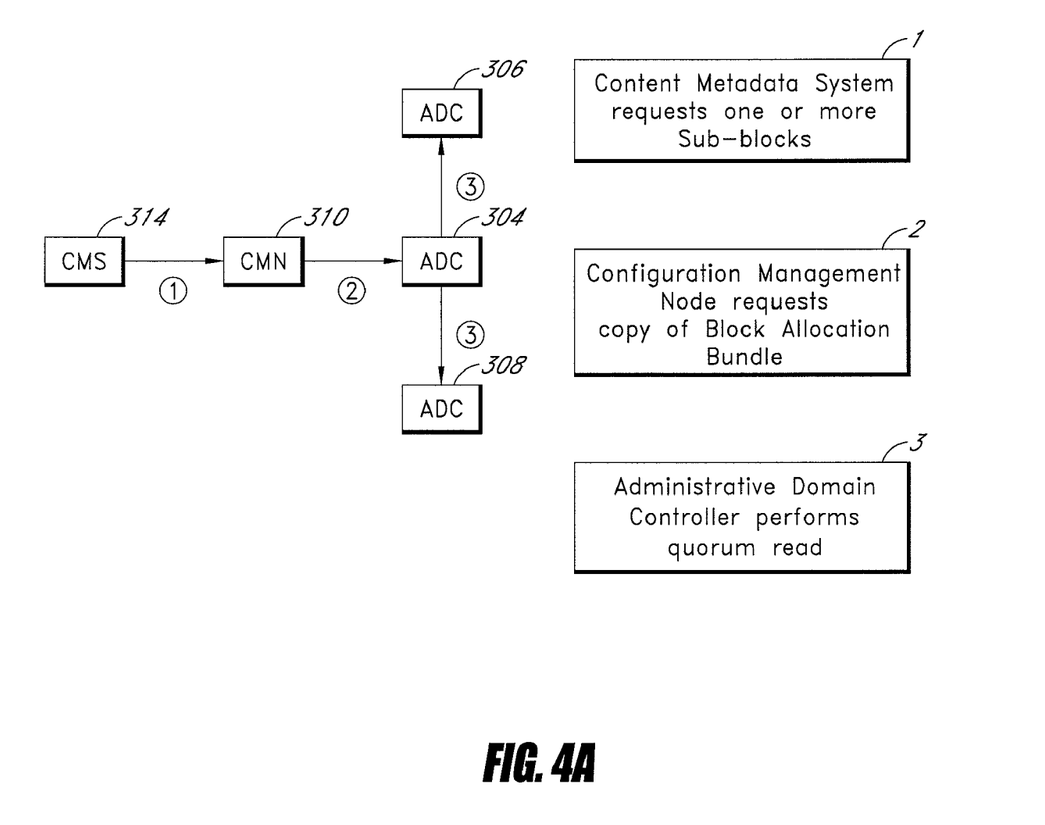
FIG. 4A illustrates communication between nodes in a distributed storage system related to a request for one or more sub-blocks.
Figure 4B:
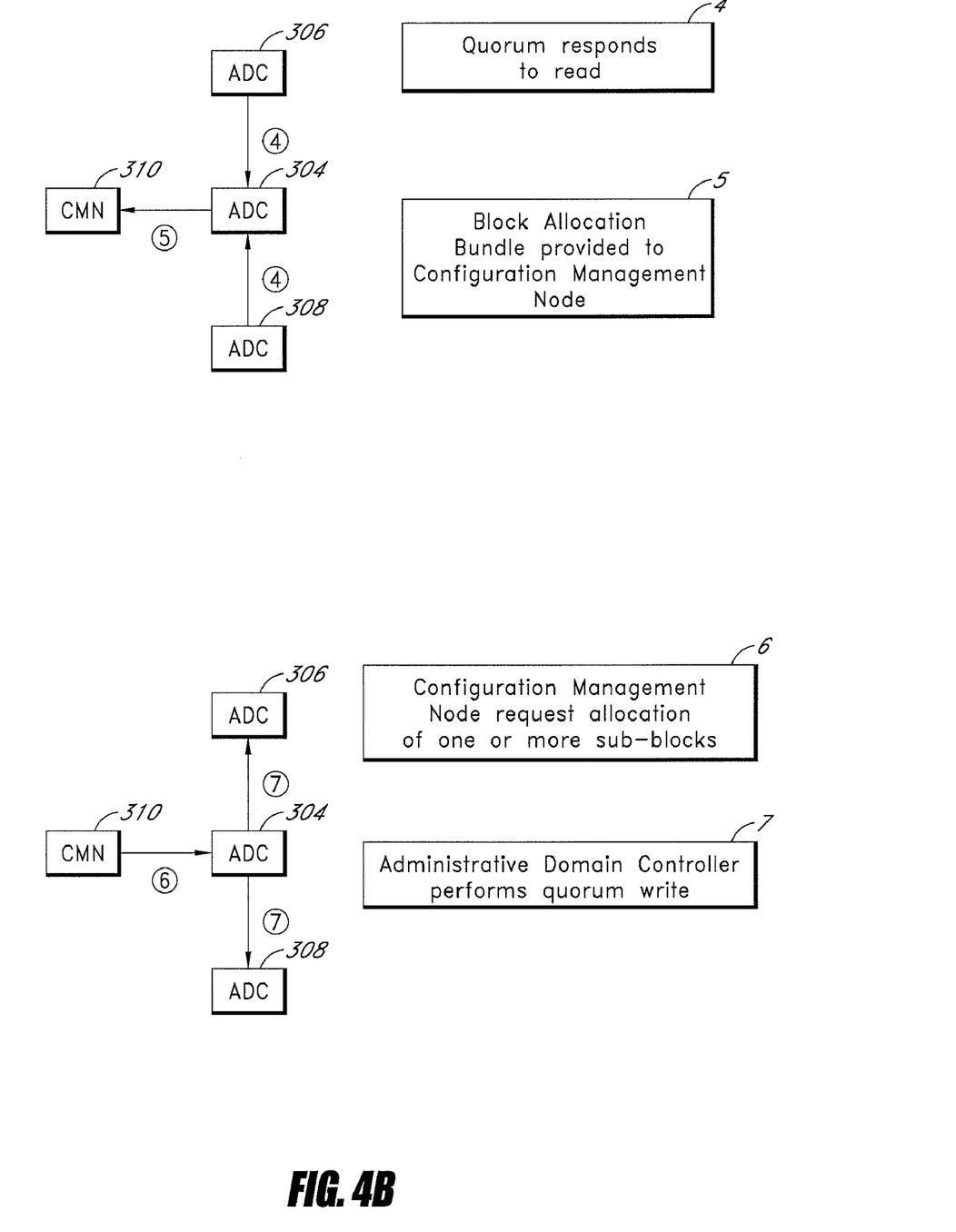
FIG. 4B illustrates communication between nodes in a distributed storage system related to a request for one or more sub-blocks.
Figure 4C:
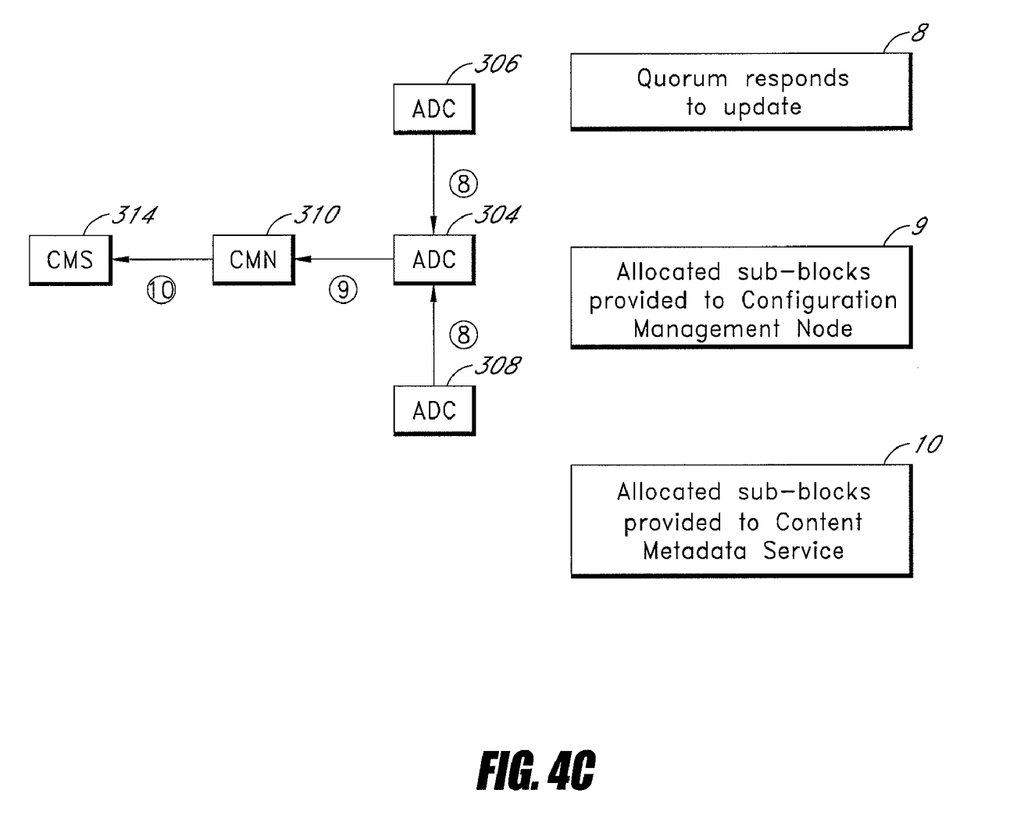
FIG. 4C illustrates communication between nodes in a distributed storage system related to a request for one or more sub-blocks.

FIGS. 4a-4c illustrate the allocation of a sub-block to a Content Metadata Service 314. The Content Metadata Service 314 first requests allocation of one or more sub-blocks from the Configuration Management Node 310. The Configuration Management Node 310 requests a copy of the block allocation bundle from the Administrative Domain Controller 304.

Retrievals of the block allocation bundle are performed by a quorum read. If, for example, there is a majority consensus about information in the block allocation bundle, then the information is presumed to be accurate. If, however, there is no majority consensus, then the block allocation bundle information cannot be trusted. The quorum read prevents an Administrative Domain Controller that is isolated from the system from providing outdated information. As illustrated in FIG. 4a, Administrative Domain Controller 304 queries the other Administrative Domain Controllers 306, 308 to determine whether a quorum has consistent information about the block allocation bundle.

FIG. 4b illustrates the response to the query from the other Administrative Domain Controllers 306, 308, to the Administrative Domain Controller 304. If there is a quorum consensus, the block allocation bundle is provided to the Configuration Management Node 310.

The Configuration Management Node 310 then requests allocation of one or more sub-blocks from the block allocation bundle. Allocation of a sub-block requires an update to the block allocation bundle to mark the sub-blocks as used, with the update being confirmed by a quorum of Administrative Domain Controllers.

FIG. 4c illustrates a quorum of Administrative Domain Controllers 304, 306, 308 confirming the update. The allocated sub-block is then provided to the Configuration Management Node 310, which provides the sub-block to the Content Metadata Service 314. The Content Metadata Service is then able to provide individual object identifiers to the storage nodes as needed.

In the event of a network or node failure, when the Block Allocation Bundle is not accessible by the Configuration Management Node, the Sub-Block Allocation Service will not be offered to the rest of the grid, and nodes will continue to generate unique identifiers from their already assigned local sub-blocks until all local sub-blocks have been completely consumed. This provides ample time window for the repair to take place. For example, in a medium sized grid with a sub-block size of $2^{24}$, approximately 160 million new objects can be processed with a single sub-block. A sustained input data rate of one 500 objects per second would provide about 89 hours (3.7 days) for restoration of the failed components. In the current state of the art data rates in nearly all applications are less than 100 objects sustained rate per second thereby allowing even more time to repair.

In the event of the failure of a Content Metadata Service, such that all local state information is lost, the locally stored sub-blocks are lost and will never be used. In the event of a failure while requesting a sub-block allocation, the sub-block being allocated will be leaked and will never be used.

Figure 5:
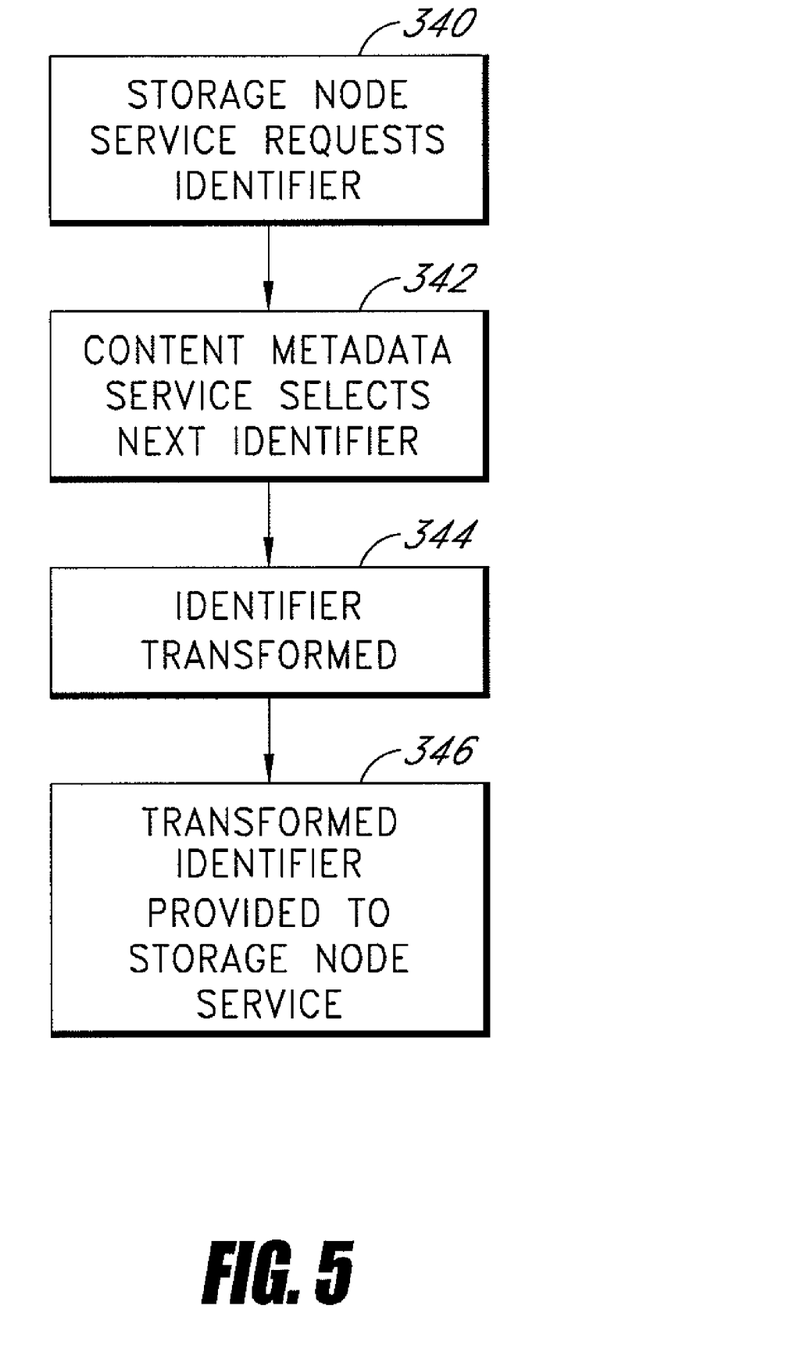
FIG. 5 illustrates steps in the transformation of an object identifier.

FIG. 5 illustrates the allocation of an object identifier to a storage node. At step 340, a storage node service requests allocation of an object identifier. The Content Metadata Service selects the next available identifier at step 342.

It is advantageous for object identifiers to be opaque so that they can not be predicted in advance. This makes the system more secure from attacks which could exploit such information. Specifically, information about relative object creation time, location of creation and other such information should not be easily extractable from an object identifier. The least predictable identifier would be one that has a 50% probability of change for each bit when comparing one object identifier to another.

The basic identifier allocation scheme will result in sequentially increasing identifiers, and does not provide these desired characteristics. In order to get these characteristics, step 344 illustrates an additional transformation after the globally unique identifier has been allocated, but before it is used. This transformation consists of an algorithm that provides one-to-one mapping within the address space such that the resulting output appears to be random. This can be accomplished using certain types of Linear Feedback Shift Registers (LFSRs) and block cipher algorithms. The transformed identifier is provided to the storage node service at step 346.

Continued adoption of digital technology in nearly all sectors including healthcare, media, government, and financial services is accelerating the creation of fixed-content data. Regulatory and business requirements for retention are resulting in the continued growth of data that must be stored and managed. In many sectors, the retention times exceed the practical lifetime of the storage media, and long term data archiving is an ongoing business challenge. As the archives grow, scaling limitations arise not only due to the size of the stored data but the number of fixed content objects that need to be stored and managed. This problem is exacerbated in regional deployments that have a large geographic footprint and operate over wide area networks which are subject to outages. There is a well defined and rapidly growing market demand for scalable fixed content storage systems that can span multiple sites, multiple storage tiers and multiple applications.

A reliable fixed content storage system can scale to store large numbers of objects and span multiple facilities, multiple storage tiers, and multiple applications. Through the assignment of object identifiers using the method described in this disclosure, risk of object identifier collisions is eliminated. This enables the solution to scale to large number of objects. In addition, the system has greater robustness in the event of computing device failures, network failures and islanded operations.

Previous approaches to provide scalable fixed-content storage systems have been based either on a traditional centralized architectures or a distributed and fully synchronized architecture. The former requires expensive computing and network resources and is not suitable for deployments that span a large geographic footprint. Distributed and fully synchronized architectures address some of the bandwidth, reliability, and footprint; however, these systems suffer from performance and scalability limitations as the number of objects grows and the geographic footprint expands. In addition, they can not ensure object identifier uniqueness in islanded configurations.

Enabling the creation of large-scale distributed fixed-content storage systems allows for reduced deployment costs when compared to a centralized model, and higher reliability and availability when compared to an older style distributed system.

The figures provide a high-level overview that partitions the functionality of the overall system into modules for ease of explanation. It is to be understood, however, that one or more modules may operate as a single unit. Conversely, a single module may comprise one or more subcomponents that are distributed throughout one or more locations. Further, the communication between the modules may occur in a variety of ways, such as hardware implementations, software implementation, or a combination of hardware and software. Further, the modules may be realized using state machines, microcode, microprocessors, digital signal processors, or any other appropriate digital or analog technology. Various components have been given names or acronyms for purposes of explanation. The names and descriptions for these components are not intended to be limiting or to necessarily coincide with narrow definitions given to these terms in the industry. Rather, the names and descriptions are used to illustrate an exemplary embodiment, and the scope of the invention should not be limited to an embodiment's specific details.

It should be understood that the algorithms described herein may be implemented in a variety of ways. Other embodiments that are apparent to those of ordinary skill in the art, including embodiments which do not provide all of the benefits and features set forth herein, are also within the scope of the invention. While some of the embodiments described herein provide specific details for implementation, the scope of the disclosure is intended to be broad and not limited to the specific embodiments described. Accordingly, details described in the specification should not be construed as limitations of the claimed invention. Rather, the scope of the claims should be ascertained from the language of the claims.

What is claimed is:

1. A method of allocating unique identifiers in a distributed storage system comprising:
   receiving an allocation of a range of identifiers for use in the distributed storage system;
   partitioning the range of identifiers into subsets;
   receiving a request from a first server for a first allocation of at least one subset of identifiers;
   providing the first server with the requested first allocation of at least one subset of identifiers, wherein providing the first server with the requested first allocation of at least one subset of identifiers comprises polling a plurality of servers to determine an available subset of identifiers and requiring confirmation of the allocation from a quorum of the plurality of servers;

receiving a request from a second server for a second allocation of at least one subset of identifiers;

providing the second server with the requested second allocation of at least one subset of identifiers, wherein providing the second server with the requested second allocation of at least one subset of identifiers comprises polling a plurality of servers to determine an available subset of identifiers and requiring confirmation of the allocation from a quorum of the plurality of servers;

transforming an identifier from the first allocation of at least one subset of identifiers and associating the transformed identifier with a first object; and transforming an identifier from the second allocation of at least one subset of identifiers and associating the transformed identifier with a second object, wherein the transformed first and second identifiers are used in a common identifier space and are assured to be unique.

2. The method of claim 1, wherein the transforming of an identifier uses a linear feedback shift register.

3. The method of claim 1, wherein the transforming of an identifier is reversible.

4. The method of claim 1, wherein the range of identifiers for use in the distributed storage system comprises a portion of the entire address space.

5. The method of claim 1, wherein the range of identifiers for use in the distributed storage system comprises the entire address space.

6. The method of claim 1, further comprising combining a first distributed storage system with a second distributed storage system, wherein, prior to the combination, identifiers allocated to the first distributed storage system are unique from identifiers allocated to the second distributed storage system.

7. The method of claim 1, wherein the first server and the second server are located at geographically separated locations.

8. The method of claim 1, wherein the first server and the second server are located in the same geographic location.

9. The method of claim 1, wherein an unsuccessful allocation of identifiers results in that allocation of identifiers not being used.

10. The method of claim 1, wherein the first allocation of identifiers is further partitioned into smaller subsets of identifiers.

11. The method of claim 1, wherein the first server performs the transforming step.

12. The method of claim 1, wherein a module that associates the transformed identifier with the first object performs the transforming step.

13. The method of claim 1, wherein the identifiers within the range are not sequential.

14. The method of claim 13, wherein the range of identifiers overlaps with at least a second range of identifiers.

15. A method of assigning unique object identifiers to fixed content objects in a distributed fixed content storage system, comprising:

allocating a plurality of identifiers from a defined address space;

assigning the plurality of identifiers to the distributed fixed content storage system;

partitioning the plurality of identifiers into subsets;

assigning at least one subset of identifiers to a storage server, wherein assigning at least one subset of identifiers to a storage server comprises polling a plurality of servers to determine an available subset of identifiers and requiring confirmation of the assignment from a quorum of the plurality of servers;

maintaining a position within the at least one subset of identifiers;

determining an identifier based on the position within the at least one subset of identifiers;

transforming the determined identifier such that the transformed identifier is assured to be unique in the transformed identifier space; and assigning the transformed identifier to a fixed content object.

16. The method of claim 15, wherein the at least one subset of identifiers is allocated on demand.

17. The method of claim 15, wherein the at least one subset of identifiers is allocated in advance.

18. The method of claim 15, wherein the entire address space is allocated to the fixed content storage system.

19. The method of claim 15, wherein at least a portion of the address space is allocated to the fixed content storage system.

20. The method of claim 15, wherein subsets of identifiers are further sub-divided.

21. The method of claim 15, wherein the allocating of subsets is performed across geographically separated locations.

22. The method of claim 15, wherein the steps are performed in the same geographic location.

23. The method of claim 15, further comprising making an allocation of identifiers unavailable when a request for the allocation of identifiers fails.

24. The method of claim 15, wherein transforming the determined identifier is reversible.

25. The method of claim 15, wherein transforming the determined identifier is irreversible.

26. The method of claim 15, wherein transforming the determined identifier uses a linear feedback shift register.

27. The method of claim 15, wherein the transformed identifier is unique from all other transformed identifiers within the address space.

28. A system to allocate unique identifiers in a distributed storage system, comprising:

an identifier partitioning module, executing on one or more processors connected to memory, that receives an allocation of a range of identifiers and partitions the range of identifiers into subsets;

an identifier allocation management module, executing on one or more processors connected to memory, configured to manage allocation of subsets of identifiers from a defined address space, wherein the identification allocation management module executes instructions to obtain confirmation from a quorum of servers in determining whether to allocate a subset of identifiers;

an identifier assignment module, executing on one or more processors connected to memory, configured to distribute an identifier from an allocated subset, the identifier being available for association with an object, the identifier assignment module further configured to obtain an allocation of at least one subset from the identifier allocation management module; and an identifier transformation module, executing on one or more processors connected to memory, configured to transform the identifier to a transformed address space, such that the transformed identifier is globally unique in the transformed address space.

29. The system of claim 28, wherein the number of bits used to represent an identifier in the transformed address space is different from the number of bits used to represent an identifier in the defined address space.

30. The system of claim 28, wherein the number of bits used to represent an identifier in the transformed address space is the same as the number of bits used to represent an identifier in the defined address space.

31. The system of claim 28, wherein the identifier transformation module is located on the same server as the identifier assignment module.

32. The system of claim 28, wherein the identifier allocation management module maintains information on a plurality of servers, and allocates subsets based on a quorum consensus of the plurality of servers.

33. The system of claim 28, wherein the identifier transformation module comprises a linear feedback shift register.

34. The system of claim 28, wherein the identifier portioning module, identifier allocation management module, identifier assignment module, and identifier transformation module execute on the same processors.

* * * * *